April 14, 1942.      H. N. CROSS      2,279,733
HOSE COUPLING
Filed Nov. 22, 1939
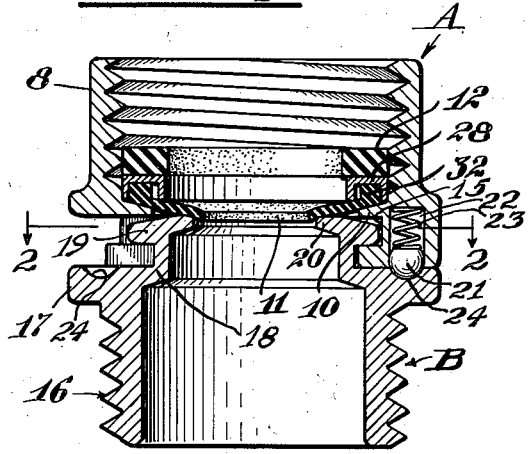
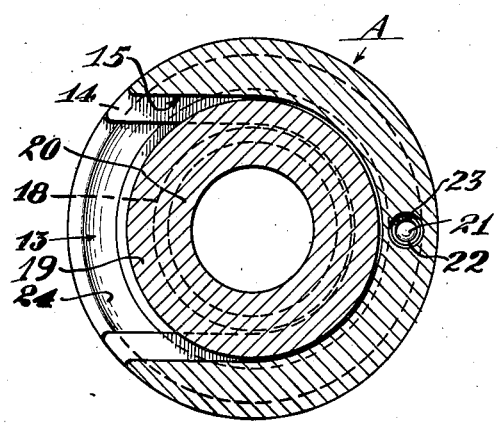
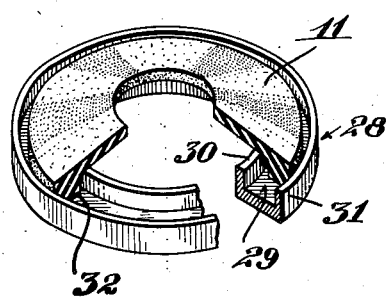
Inventor
Harry N. Cross
By R. S. Berry
Attorney Patented Apr. 14, 1942

2,279,733

UNITED STATES PATENT OFFICE 2,279,733

HOSE COUPLING

Harry Norman Cross, Los Angeles, Calif.

Application November 22, 1939, Serial No. 305,670

3 Claims. (Cl. 285—143)

This invention relates to a hose coupling and has as its primary object the provision of a coupling in which the parts may be easily and quickly connected and disconnected and in a manner readily apparent and easily comprehended.

Another object is to provide a hose coupling embodying a member attachable in fixed relation to a conduit connected to a source of fluid under pressure, and also embodying a member adapted to be detachably attached to the first named member, and also adapted to be connected to a portable hose or conduit, and in which the connection between said members is such that the hose carrying member will be revoluble relative to the other member when attached thereto.

Another object is to provide a construction in the coupling whereby the joint between the coupling members may be sealed under the influence of the pressure of a fluid or liquid flowing outwardly through the coupling and whereby the type of seal set forth in the United States Letters Patent Number 1,994,454, issued to me under date of March 19, 1935, may be employed.

A further object is to provide a hose coupling in which the interconnection and disconnection of the companion parts is effected by advancing the movable member relative to the fixed member diametrically thereof, and in which means are provided whereby the parts will be detachably held in interengagement against accidental disconnection.

With the foregoing objects in view, together with such other objects and advantages as may subsequently appear, the invention is carried into effect as illustrated by way of example in the accompanying drawing, in which:

Fig. 1 is a view in cross section of a further modification of the invention;

Fig. 2 is a view in horizontal section taken on the line 2—2 of Fig. 1 as seen in the direction indicated by the arrows;

Fig. 3 is a perspective view of a beveled crowding ring employed in the construction shown in Fig. 1.

Referring to the drawing more specifically A indicates one of the coupling members which is adapted to be attached in fixed relation to the discharge end of a conduit connected with a source of fluid supply under pressure such as a pipe or faucet having an externally threaded discharge end, in which case the member A embodies an internally threaded annular end portion 8 for effecting the mounting and demounting of the member relative to a threaded conduit.

Formed interiorly of the member A intermediate its ends is an inwardly extending continuous flange 10 which is formed with a beveled or inclined face on the side thereof presented toward the internally threaded end portion 8 of the member and the opposite side of which is flat and extends on a plane perpendicular to the longitudinal center or axis of the member. Seated on the flange 10 is an annular flexible and resilient ring 11, the inner margin of which protrudes inwardly from the inner margin of flange 10 and terminates either on a plane spaced slightly inward or slightly outward from the plane of the flat face of the flange as shown in Fig. 1.

The end portion of the member A protruding beyond the flat face of the flange 10 is formed with a circumferentially extending elongated slot 13 having a length substantially corresponding to the diameter of the opening bordered by the flange 10. The slot 13 opens to the contiguous end of the member A and formed on its outer margin is an inwardly extended flange 14 between which and the flat face of the flange 10 is formed an open ended U-shaped channel 15 one side of which is formed by the flange 10 and the opposed side of which is formed by the flange 14 while the open end thereof is formed by the slot 13, and which channel partly surrounds the opening bordered by the flange 10.

The detachable member B of the coupling is formed with a tubular end portion 16 for engagement with a portable hose or other conduit on which it is carried; the end portion 16 being externally threaded for such purpose. Formed intermediate the ends of the member B is an annular flange 17 having a flat end face from which protrudes an annular nipple 18 formed at its outer end with outwardly and inwardly extending flanges 19 and 20 formed in continuation of each other and having collective flat outer faces extending on a plane perpendicular to the axis of the member B.

The nipple 18 with its end flanges 19 and 20 is adapted to be passed through the slot 13 with the external flange 19 received in the U-shaped channel 15 and arranged to seat on the flange 14 with the flat outer face of the combined flanges 19 and 20 located contiguous to the flat face of the flange 10 in slidable relation thereto. The flange 20 is formed to protrude inwardly beyond the inner margin of the flange 10 so as to underlie the protruding marginal portion of the flexible ring 11 when the parts are assembled.

Means are provided for releasably holding the members A and B in their interconnected relation against accidental detachment, which means is here shown as embodying a ball detent 21 mounted in a recess 22 formed in the member A with the ball arranged to protrude from the end face of the latter under the urge of a spring 23 in position for engagement with an annular channel 24 formed in the flat end face of the flange 17 on the member B. By this arrangement when the coupling member B is assembled on the member A the detent 21 will project into the channel 24 regardless of the circumferential relation of the members A and B to each other and whereby the detent will serve to resist lateral separation of the coupling members yet permit free revolving movement of the member B relative to the member A.

A metallic crowding ring 28 is interposed between the gasket 12 and the flexible ring 11, which crowding ring is formed on its under side with a continuous channel 29 having narrow inner and outer side flanges 30 and 31 whereby the ring 28 will seat astride a marginal rib 32 on the ring 11 to hold the latter in position. The outer flange 31 of the ring 28 will seat on the flange 10 to prevent the crowding ring from damaging the flexible ring 11.

In the operation of the invention, the coupling member A is attached to the discharge outlet of a conduit through which fluid may be discharged under pressure, in a usual manner. The coupling member B is applied to a flexible conduit such as a hose in the conventional manner. When it is desired to interconnect the coupling members A and B the flanged nipple 18 of the latter is inserted through the slot 13 in the member A to position the flange 19 of the nipple in a seated position on the flange 14 and with the margin of the flange 20 of the nipple disposed in concentric relation to the inner margin of the flexible ring 11. When the parts are so disposed, the ball detent 21 will project into the annular channel 24 thus holding the members in their connected relation against free lateral movement relative to each other yet permitting of their relative rotative movement.

On directing fluid under pressure into the coupling member A such fluid will act to depress the protruding inner marginal portion of the ring 11 against the flat surface of the flange 20 thereby effectively sealing the joint between the coupling members against leaking of the fluid through such joints yet permitting rotating movement of the coupling member B relative to the member A around their respective axes.

When it is desired to separate the coupling members where the ball detent 21 is employed, it is only necessary to impart a lateral pull on the coupling member B in an outward direction as to cause the nipple 18 to pass outwardly through the slot 13. On imparting sufficient pull on the member B as stated to overcome the pressure of the spring 23 on the detent 21 the latter will be retracted out of the channel 24 after which little effort is required to effect complete withdrawal of the coupling member B out of engagement with the member A. Manifestly the flow of fluid through the coupling should be shut off before effecting disconnection of the coupling members.

It is to be noted that the ball detent 21 is arranged at a point on the diameter of the member A leading centrally between the ends of the slot 13 so that on exerting a pull or thrust on the member B in the direction of such diameter the detent will ride out or into the channel 24 in a radial direction relative thereto.

By the provision of the construction and mode of operation above set forth the several objects of the invention are attained. However while I have shown and described a specific embodiment of the invention I do not limit myself to the exact details of construction and arrangement shown, and accordingly the invention is to be deemed to include such changes and modifications as come within the purview of the appended claims.

I claim:

1. A hose coupling comprising a pair of coupling members one of which is formed with an elongated circumferentially extending slot opening to one end thereof the ends of which connect with the ends of an inwardly extending U-shaped channel one margin of which consists of a correspondingly shaped inwardly extending flange, a continuous annular flange in said slotted member forming the other margin of said slot having an inclined face opposing said slot, a frusto-conical flexible and resilient ring seated on the inclined faces of said flange having its inner marginal portion protruding inwardly from said flange, a nipple formed on the other coupling member protruding from the end thereof and having a continuous out-turned marginal flange formed for positioning in the U-shaped channel in the other member, said nipple also being formed with an inturned marginal flange arranged with its inner margin in outwardly spaced relation to the inner margin of said ring when said coupling members are operatively interconnected, and a crowding ring movable axially in said slotted member for engaging said flexible ring and said inclined face of the flange in said slotted member.

2. In a hose coupling, a tubular coupling member, a nipple protruding from one end thereof having on its outer end an outwardly projecting continuous marginal flange and an inwardly projecting continuous marginal flange with said flanges arranged with their outer end faces formed in continuation on a plane perpendicular to the axis of said tubular member, a second tubular member formed with a circumferentially extending side slot opening to an end thereof connecting to the ends of a U-shaped channel extending inwardly of said slotted member, an annular internal flange in said second tubular member, said nipple being adapted to be passed through said slot diametrically of said member with the outer marginal flange on said nipple seating on one margin of said channel, and a flexible resilient ring seated on said internal flange of said slotted member having a free inner marginal portion adapted to be seated under the action of fluid pressure flowing through said coupling against the end face of said internal marginal flange on said nipple; said flexible ring having a rib on its outer margin, and an annular crowding ring in the second tubular member having a channel receiving said rib for retaining the ring in place and crowding it against said internal flange, the outer margin of said crowding ring being disposed to seat on said internal flange.

3. In a hose coupling, a tubular coupling member, a nipple protruding from one end thereof having on its outer end an outwardly projecting continuous marginal flange and an inwardly projecting continuous marginal flange with said flanges arranged with their outer end faces formed in continuation on a plane perpendicular to the axis of said tubular member, a second tubular member formed with a circumferentially extending side slot opening to an end thereof connecting to the ends of a U-shaped channel extending inwardly of said slotted member, an internal flange in said second tubular member having an inclined surface, said nipple being adapted to be passed through said slot diametrically of said member with the outer marginal flange on said nipple seating on one margin of said channel, a flexible resilient ring carried interiorly of said slotted member having one side of its outer marginal portion seated on said inclined surface and also having a free inner marginal portion adapted to be seated under the action of fluid pressure flowing through said coupling against the end face of said internal marginal flange on said nipple; said external flange being adapted to have unlimited turning movement in said slotted coupling member, and means carried by one of said coupling members detachably engageable with the other of said members to hold said members in relative revoluble interengagement with each other and against accidental lateral disengagement from each other, a washer in said slotted member, a channelled crowding ring engaged with and between said flexible ring and said washer, and a marginal rib on the flexible ring seated in the channel of the crowding ring, said internal flange, crowding ring and washer being axially aligned and said crowding ring having its channelled side opposed to and adapted to seat against said internal flange.

HARRY NORMAN CROSS.